United States Patent [19]

Nagai et al.

[11] Patent Number: 4,808,499

[45] Date of Patent: Feb. 28, 1989

[54] LITHIUM SECONDARY BATTERY

[75] Inventors: Ryo Nagai, Nara; Kazumi Yoshimitu, Ibaraki; Kozo Kajita, Shiga; Noboru Odani, Takatsuki, all of Japan

[73] Assignee: Hitachi Maxell, Ltd., Osaka, Japan

[21] Appl. No.: 97,394

[22] Filed: Sep. 16, 1987

Related U.S. Application Data

[63] Continuation of Ser. No. 739,667, May 31, 1985, abandoned.

[30] Foreign Application Priority Data

May 31, 1984 [JP] Japan ................................ 59-112260
Sep. 8, 1984 [JP] Japan ................................ 59-188575
Sep. 17, 1984 [JP] Japan ................................ 59-195335

[51] Int. Cl.$^4$ ............................................. H01D 4/58
[52] U.S. Cl. ..................................... 429/218; 429/245
[58] Field of Search ............................. 429/218, 245

[56] References Cited

U.S. PATENT DOCUMENTS

| | | | |
|---|---|---|---|
| 3,506,492 | 4/1970 | Buzzelli et al. | 429/218 X |
| 3,634,144 | 1/1972 | Hanawalt | 429/218 X |
| 4,091,152 | 5/1978 | Rao et al. | 429/194 X |
| 4,288,500 | 9/1981 | Jovanovic et al. | 429/218 X |
| 4,404,268 | 9/1983 | Imai et al. | 429/218 X |
| 4,495,258 | 1/1985 | Le Mehaute et al. | 429/218 X |
| 4,500,614 | 2/1985 | Nagamine et al. | 429/218 X |

Primary Examiner—Brian F. Hearn
Assistant Examiner—Stephen J. Kalafut
Attorney, Agent, or Firm—Birch, Stewart, Kolasch & Birch

[57] ABSTRACT

In a lithium secondary battery having lithium ion electrical conductive electrolyte, a positive electrode and a negative electrode, the negative electrode being formed by a Li-Ga-In alloy.

10 Claims, 2 Drawing Sheets

LITHIUM SECONDARY BATTERY

This application is a continuation of application Ser. No. 739,667, filed on May 31, 1985, now abandoned.

FIELD OF THE INVENTION

The present invention relates to a Lithium secondary battery.

BACKGROUND OF THE INVENTION

In conventional lithium secondary batteries, metallic lithium is used as the negative electrode. In this conventional battery, lithium deposited during charging of the battery is active and it tends to react on the electrolyte to form dendrite growth thereby resulting in penetrating a separator between the negative electrode and a positive electrode, further, causing an electrical short circuit, or the precipitated lithium is powdered and separated. Therefore in the conventional lithium battery a sufficient reversibility between charging and discharging cannot be expected.

To suppress the reaction on the electrolyte, and dendrite growth, and separation of the precipitated lithium, there is proposed a method of using a lithium alloy such as lithium-aluminum for the negative electrode of the lithium battery based on an increment of a diffusion factor of lithium in the negative electrode using the alloying reaction of lithium. This proposal is effective for improving the characteristics of the lithium secondary battery. However, a problem in the proposed method is that it is difficult to obtain a sufficient reversibility between charging and discharging of the battery under a high current since an over potential occurs during deposition of lithium under a high charging current.

OBJECT OF THE INVENTION

An object of the present invention is to provide a lithium secondary battery having a negative electrode which conducts charging and discharging with an improved stability.

Another object of the present invention is to provide a negative electrode for use in a lithium secondary battery in which the negative electrode can be easily molded using powder.

A further object of the present invention is to provide a lithium secondary battery having a negative electrode in which separation of the negative electrode material is effectively prevented.

SUMMARY OF THE INVENTION

Figure 1:
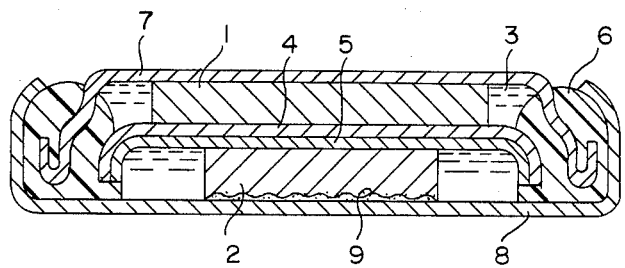
FIG. 1 is a cross sectional view showing an example of a lithium secondary battery according to the present invention.

The present inventors have devised lithium secondary batteries having negative electrodes made of lithium, gallium and indium alloy for improving the charge and discharge characteristics of the battery.

By alloying lithium in gallium and indium, lithium which tends to form dendrite is easily diffused in gallium and indium by alloying thereof so that dendrite growth of lithium is suppressed and the charge and discharge characteristics of the battery can be improved. Also, lithium deposited during charging of the battery is directly alloyed, causing the activity of the deposited lithium to be lowered, whereby undesired changing of the quality of the electrolyte can be effectively prevented since the reaction of lithium with the electrolyte is suppressed.

Preferred composition is shown by the area surrounded by A (Li 75%, Ga 20% and In 5%), B (Li 25%, Ga 70% and In 5%), C (Li 25%, Ga 15% and In 60%) and D (Li 75%, Ga 5% and In 20%) wherein the amount of each component is atomic percentage. Especially, the composition in the area surrounded by E(Li 65%, Ga 30% and In 5%), F(Li 35%, Ga 60% and In 5%) G(Li 35%, Ga 35% and In 30%) and H(Li 65%, Ga 12% and In 23%) is preferred.

The amount of the respective components were defined according to experimental results. Particularly the amount of lithium is defined as mentioned above partly because with a smaller amount, the amount of the active material per volume of the negative electrode is decreased, and then the volume efficiency of the negative electrode is decreased and the concentration polarization is increased. To the contrary, with the amount of lithium more than the above amount, the amount of diffusion of lithium into the negative electrode is insufficient and therefore, reversibility between charging and discharging of the battery becomes inferior. It is apparent that the amounts of gallium and indium as mentioned above can contribute to improve the property of the lithium secondary battery according to the result of experiments although the reason why the improvement can be obtained is not clear.

It is noted that in a case where the battery is used with a small amount of current the lithium secondary battery having the composition out of the range defined by the claims can act with good charge and discharge characteristics.

Li-Ga-In alloy is hard, and therefore the workability of shaping the alloy is difficult. In order to overcome these disadvantage, a powder form of Li-Ga-In is usually used so as to be molded into a disc shape by press molding. However, since stickness of Li-Ga-In alloy is inferior, the molded product of the electrode is easily destroyed when it is taken out of a pressing mold. Therefore, it has been considered that Li-Ga-In alloy is difficult for practical use for shaping the negative electrode.

The present inventors sought to improve the workability of shaping of Li-Ga-In alloy and discovered that by adding lithium powder within Li-Ga-In powder, and by pressing the mixed powder into the shape of the negative electrode, workability of shaping of the mixed material is improved since the added lithium may act as a bonding agent destruction of the molded electrode can be prevented at the time of taking the molded electrode out of the pressing mold and also at the time of assembling of the molded electrode in the battery, eliminating the problem of separation of the electrode material during charging and discharging of the battery. It is further possible to increase the capacity of the battery when the negative electrode made of the alloy in which lithium powder is added to the Li-Ga-In powder is used. Thus, the present invention enables further improvement of the charge and discharge characteristics of the lithium secondary battery.

As the mixing ratio of Lithium powder and Li-Ga-In alloy powder, preferably the amount of Li-Ga-In alloy powder:Lithium powder is 1:0.05 to 1.1 and especially 1:0.1 to 1:0.4 is desired. With a ratio of lithium powder less than 0.05, moldability of the Li-Ga-In material becomes difficult and the negative electrode may be easily destroyed and the reversibility between the changing and discharging cannot be improved. To the contrary, with a ratio of lithium powder more than 1.1, there tends to occur the reaction of lithium on the electrolyte, short circuiting between the electrodes due to dendrite growth of the deposited lithium and peeling of the electrode material, whereby good properties of charge and discharge obtained in the Li-Ga-In battery cannot be expected.

In one example of the production of the negative electrode using a mixture of lithium powder and Li-Ga-In alloy powder, the mixture is put in a mold and shaped under a pressure of 1 to 7 ton/cm$^2$. Since the added Lithium powder acts as a bonding agent, failure in molding may be decreased compared to the case where only Li-Ga-In alloy powder is used.

Another method of the production of the negative electrode using a mixture of Lithium powder and Li-Ga-In alloy powder is to use porous metal shaped into the shape of the negative electrode, and filling the pores of the electrode by the powder of the mixture. By this construction, deposition of the electrode material or dendrite growth can be prevented so that peeling of the electrode material is avoided, facilitating to installation of the negative electrode in the battery.

As the porous metal, foamed metal called SELMET (trade name) is used. Such foamed metal is made in such a manner that a metal coating is made on all surface of the meshed portions or the pores of foamed poly urethane material so as to form three dimensional continuous mesh construction of metal having communicating holes, thereafter the polyurethane material is burnt and restored. The foamed metal has a porous factor of 45 to 99%. As the coating material, Ni or Ni alloy is used in view its stability against lithium and high conductivity.

Filling of the lithium alloy powder into the pores of the porous metal electrode is done by sprinkling lithium alloy powder over the porous electrode and tapping the electrode so that powder is filled in the pores of the porous alloy under a suitable pressure. Shaping into a desired electrode configuration for installing in the battery occurs. Since the pores are communicated together and the porous factor is large a, large amount of the powder is filled in the pores of the porous electrode. By filling the powder into the pores of the porous alloy electrode using tapping, a process of pressing and shaping may be omitted.

When the electrode as mentioned above is installed in a battery, since the lithium alloy powder is kept in the pores which communicate together in the three dimension mesh manner, lithium alloy powder is prevented from falling out of the pores. Keeping high charge and discharge characteristics since electrolyte can enter in the pores. In addition since the electrode made in the manner as described above can serve as an electric collector, the charge and discharge characteristics can be improved.

As the porous metal electrode, punching metal and expander metal having straight holes may be unsuitable since the lithium allow powder easily falls from the pores and furthermore, the viscosity of the lithium allow powder is decreased as the amount of lithium decreases at the time of charge and discharge of the battery.

As the positive active material, various materials usually used for the secondary battery may be used. For example, $TiS_2$, $MoS_2$, $MoS_3$, $FeS_2$, $ZrS_2$, $NbS_2$, $NiPS_3$, and $VSe_2$ may be used. Particularly, $TiS_2$ is preferably used since it has double layer construction with a high diffusion factor.

As the electrolyte, organic electrolyte, solid electrolyte having lithium ion conductivity may be used. As the organic electrolyte, liquid organic electrolyte, so called non water electrolyte normally used for the battery of this type, may be used. For example, solvent of 1,2-dimethoxyethane, 1,2,-diethoxyethane, propylenecarbonate, $\gamma$-butyrolactone, tetrahydrofuran, 2-methyltetrahydrofurane 1,3-dioxolune, 4-methyl-1,3-dioxolane and the mixture thereof to which electrolyte of $LiClO_4$, $LiPF_6$, $LiBF_4$ and $LiB(C_6H_5)_4$ or the mixture thereof is added may be used.

As the solid electrolyte, various solid electrolyte may be used. For example, $Li_4SiO_4$-$Li_3PO_4$, $Li_3N$-$LiI$ having a high deposition voltage are preferably used. In the liquid organic electrolyte as mentioned above hexa methylphospholic triamide may be added as the stabilizing agent.

EXAMPLE 1

50:50 in atomic percentage of Ga and In were alloyed in a ceramic crucible under 80° C. Subsequently, Ga-In alloy and Li were taken in a manner that the atomic percentage of Li was equal to the atomic percentage of the Ga-In alloy and they were alloyed in argon flow using a molybdenum boat under 650° C. for 5 hours. The alloy was powdered using an agate mortar in argon atmosphere and the powder containing 40 mAh (148 mg) was taken. Then the taken powder was pressed under 4 ton/cm$^2$ so as to shape a round plate having a 14 mm diameter and 0.2 mm thickness.

A lithium secondary battery as shown in FIG. 1 having 20 mm diameter and 1.6 mm height was made using the pressed member as the negative electrode and a positive electrode made by pressing powder of $TiS_2$ using polytetrafuluoroethylene as binder and having 11 mm diameter and 0.35 mm thickness, further using liquid organic electrolyte made of 4-methyl-1,3-dioxyorane and 1,2-dimethoxyethane and hexamethylphospholictriamide with the volume of 60:35:5 to which $LiPF_6$ was added by 1 mol/l.

Referring to FIG. 1, 1 denotes a negative electrode made by pressing the Li-Ga-In alloy powder, 2 is a positive electrode made of $TiS_2$. 3 denotes liquid organic electrolyte, 4 is a separator made of porous polypropylene film, 5 is absorbing member made of polypropylene nonwoven sheet for absorbing electrolyte, 6 is a gasket made of polypropylene, 7 is a negative electrode can made of stainless steel plate with the outer surface thereof coated by nickel. 8 is a positive electrode can made of stainless steel plate with the outer surface thereof coated by nickel and 9 is a positive current collector made of stainless steel mesh.

The battery as mentioned above was subjected to a charge and discharge cycle test with the charge stopping voltage of 2.4 volt and discharge stopping voltage of 1.5 volt. The number of cycles of the charge and discharge versus available capacity (discharge capacity) of the battery is shown in A in FIG. 3.

EXAMPLE 2

83.5:16.5 in atomic percentage of Ga and In were alloyed in a ceramics crucible under 80° C. Subsequently, Ga-In alloy and Li were taken in a manner that the atomic percentage of Li was equal to the atomic percentage of the Ga-In alloy and they were alloyed in argon flow using a molybdenum boat under 650° C. for 5 hours. The alloy was powdered using an agate mortar in argon atmosphere and the powder containing 40 mAh (125 mg) was taken. The powder was pressed under 4 ton/cm$^2$ so as to shape a round plate having 14 mm diameter and 0.2 mm thickness.

A lithium secondary battery was prepared generally in a similar manner as explained in the EXAMPLE 1 except for using the pressed member of Li-Ga-In alloy as mentioned above as the negative electrode. The charge and discharge cycle test was performed in a similar manner as used in the EXAMPLE 1 and the result is shown in a curve B in FIG. 3.

EXAMPLE 3

A Lithium disc of 14 mm diameter and b 0.2 mm thickness was soaked in Ga-In alloy of atomic percentage ratio 83.5:16.5 prepared in a similar manner of example 2. The Ga-In alloy of this type is liquid at ambient temperature. The surface of the lithium disc covered by the Ga-In alloy was mechanically scraped by a spatura so as to form a thin layer of Ga-In alloy material on the surface of lithium, thereby providing a negative electrode.

A lithium secondary battery was prepared in a similar manner as in Example 1 except for using the negative electrode as mentioned above. A similar charge and discharge test was made on Example 3 and the result is shown by curve C in FIG. 3.

COMPARATIVE EXAMPLE 1

A battery generally the same as in Example 1 except for using a lithium disc of 14 mm diameter and 0.2 mm thickness (Lithium electric capacity 70 mAh) was prepared. The charge and discharge tests were performed on the Comparative Example 1 in the same manner as performed in Example 1 and the result is shown in curve W in FIG. 3.

COMPARATIVE EXAMPLE 2

A battery generally same as in Example 1 except for using a Li-Al alloy disc of 14 mm diameter and 0.2 mm thickness made of Li and Al with the atomic percentage ratio of 50:50 as the negative electrode. The charge and discharge tests were performed on the Comparative Example 2 in the same manner as performed in the Example 1 and result is shown in curve X in FIG. 3.

Figure 3:
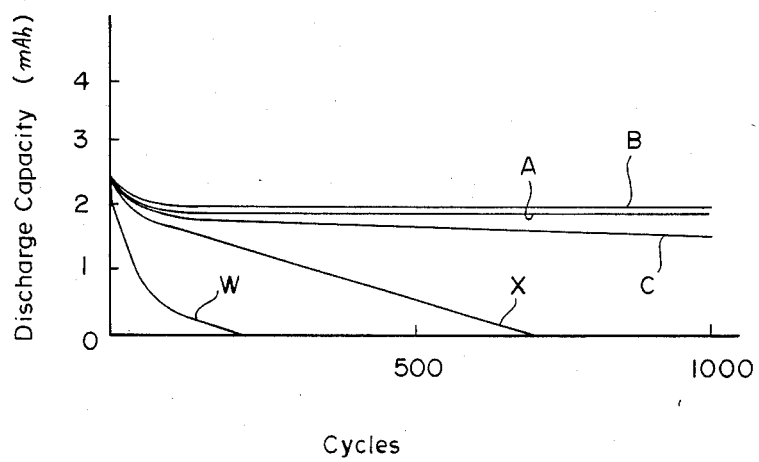
FIG. 3 is a graph showing characteristic curves of the examples of the lithium secondary battery according to the present invention and comparative examples with the vertical axis representing the discharging capacity and the horizontal axis representing the number of cycles of charge and discharge.

As shown in FIG. 3, the battery of the Comparative Example 1 using Lithium of a simple substance was unable to take the electric power after 200 cycles of charge and discharge. To the contrary, the batteries of Examples 1 through 3 of the present invention were able to take out the electric power more than 1.5 mAh after 1000 cycles of charge and discharge, whereby it was apparent that the batteries according to the present invention were superior in charge and discharge characteristics. The battery of the Comparative Example 3 using Li-Al alloy as the negative electrode was also unable to take the electric power after 700 cycles of charge and discharge.

There is no specific difference between the Example 2 and Example 3 in charge and discharge characteristics as apparent from the comparison of the curves of B and C in FIG. 3.

EXAMPLES 4 TO 18

Li, Ga and In alloys were prepared with the atomic percentage ratio thereof as shown in the Table 1 and alloyed using molybdenum boats in the argon flow with 650° C. for 3 hours. The Li-Ga-In alloys thus obtained were powdered in the argon gas atmosphere. Various kinds of Li-Ga-In alloy powder were taken with the amount thereof as shown in the Table 1 and put in a mold having a round recess of 14 mm diameter under 4 ton/cm$^2$. The theoretical capacity of lithium in the various examples was 40 mAh.

Lithium secondary batteries were prepared in the same manner as described in Example 1 using the negative electrodes made of materials respectively as defined in the Table 1 and the charge and discharge cycle tests were performed in the same condition as used in the Example 1 so as to examine the discharge capacity against the number of cycles of charge and discharge. The discharge capacity is shown in Table 1.

As shown in Table 1, the batteries of Examples 4 to 18 had the same characteristics as Examples 1 to 3 and show discharge capacities larger than those of Comparative Examples 1 and 2. It is shown that the charge and discharge characteristics as improved.

EXAMPLE 19

Li, Ga and In were taken with the atomic ratio of 50:41.8;8.2 (with the atomic percentages of Lithium 50%, Ga 41.8% and In 8.2%) and they were alloyed in a molybdenum boat in argon gas flow with 650° C. for 3 hours. The Li-Ga-In alloy was powdered in the argon atmosphere. 126.4 mg of Li-Ga-In alloy powder was mixed with 5.8 mg of lithium powder in a mortar and the mixture was put in a mold of 16 mm diameter and pressed under 3.5 ton/cm$^2$ and a shaped member of 0.2 mm thickness was obtained. The mixing ratio of the Li-Ga-In alloy powder and lithium powder was 1:0.28 of theoretical volume ratio and the amount of the lithium was corresponding to 62 mAh.

A lithium secondary battery was prepared in the same manner as in Example 1 except for using the shaped member made of mixture of Li-Ga-In alloy powder and lithium powder mentioned in Example 19 as the negative electrode.

The battery of example 19 was subjected to charge and discharge cycle test with the charge stopping voltage of 2.7 volts and discharge stopping voltage of 1.3 volts under a constant current of 5 mA.

EXAMPLE 20

126.4 mg of Li-Ga-In alloy powder of the same composition of the example 19 and 11.6 mg of Lithium powder, and a lithium secondary battery was prepared in the same manner as in Example 19 except for using the negative electrode shaped by pressing the mixed material as described above. The mixing ratio of the Li-Ga-In alloy powder and lithium powder was 1:0.57 of theoretical volume ratio.

EXAMPLE 21

126.4 mg of Li-Ga-In alloy powder of the same composition of the Example 19 and 1 mg of lithium powder were mixed, and a lithium secondary battery was prepared in the same manner as in Example 19 except for using the negative electrode shaped by pressing the mixed material as described above. The mixing ratio of the Li-Ga-In alloy powder and lithium powder was 1:0.05 of theoretical volume ratio.

The batteries of the Examples 20 and 21 were subjected to the charge and discharge cycle test in the same condition as in the Example 19 and discharge capacity against the cycles was examined. The discharge capacity after the 1000 cycles of charge and discharge is shown in Table 2.

EXAMPLES 22 TO 36

Li, Ga and In alloys were prepared with the atomic percentage ratios thereof as shown in Table 3 and alloyed using molybdenum boats in the argon flow with 650° C. for 3 hours. The Li-Ga-In alloys thus obtained were powdered in the argon gas atmosphere. Various kinds of Li-Ga-In alloy powder and lithium powder were taken with the amount thereof as shown in Table 3 and put in a mold having a round recess of 16 mm diameter under 4 ton/cm$^2$. The mixing ratio of Li-Ga-In alloy powder and the lithium powder was 1:0.28 of theoretical volume ratio. The theoretical capacity of lithium in the various examples was 62 mAh.

Lithium secondary batteries were prepared in the same manner as described in Example 19 using the negative electrodes made by the materials respectively as defined in Table 3 and the charge and discharge cycle tests were performed in same condition as used in Example 19 so as to examine the discharge capacity against the number of cycles of charge and discharge. The discharge capacity after 1000 cycles is shown in Table b 3.

EXAMPLE 37

As the lithium alloy, Li-Ga-In alloy with the atomic ratio of 100:83.5:16.5 was used.

Alloying was done in such a manner that predetermined amounts of lithium, gallium and indium were put in a molybdenum boat and processed at 650° C. in argon gas flow for 3 hours. After cooling, the obtained alloy was powdered. A porous nickel disc of a pore ratio of 95%, 0.5 mm thickness and 16 mm diameter formed by being punched from porous nickel was put in a mold of 16 mm diameter. The Li-Ga-In powder of 132 mg (corresponding to 41.8 mAh) was placed above the disc, thereby causing the powder to be filled in the pores of the disc tapping the disc. After this process, the disc was pressed under a pressure of 5 ton/cm$^2$ so as to form a disc of 0.28 mm thickness and the disc thus formed was installed as a negative electrode. Thus a battery similar to Example 1 except for using the disc as mentioned above as the negative electrode was prepared. The battery in Example 37 was subjected to the charge and discharge test with the change stopping voltage of 2.7 volts and discharge stopping voltage of 1.3 volts with a constant current of 5 mA for charge and discharge current. The discharge capacity after 1000 cycles is shown in Table 4.

EXAMPLE 38

A mixture of 126.4 mg of Li-Ga-In alloy powder with the atomic ratio 100:83.5:16.5 and 5.8 mg of lithium powder was prepared and the negative electrode was formed by the mixture in a similar manner as Example 37. A lithium secondary battery was prepared using the negative electrode as described above in the same manner as in Example 37. The battery of Example 38 was tested in the same manner as in Example 37. The result is shown in Table 4.

Figure 2:
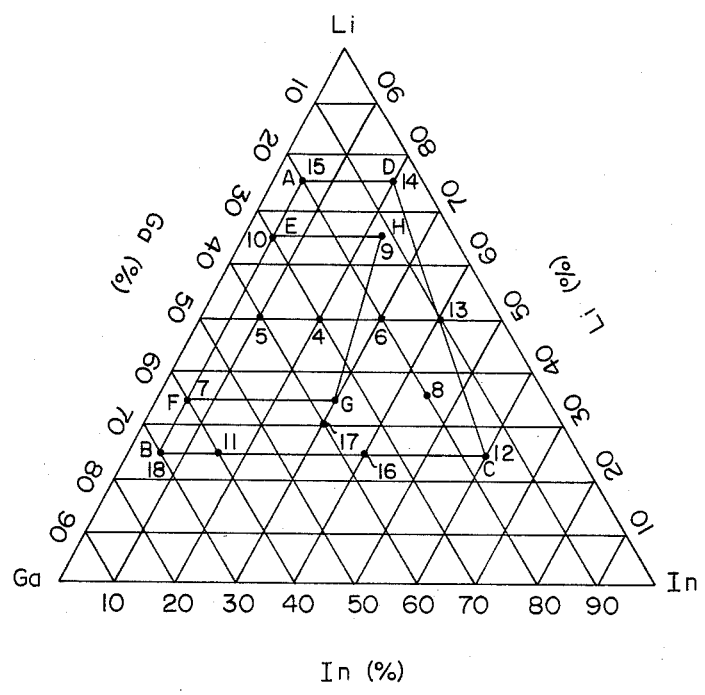
FIG. 2 is a triangle co-ordinate graph showing the preferred area of composition of lithium, gallium and indium used in the lithium secondary battery according to the present invention.

It is noted that in FIG. 2, the respective composition on the boundaries of the respective areas may be included as the preferred composition for use in the battery according to the present invention, and the reference numerals in FIG. 2 represent the number of the respective experimental Examples.

It is noted that the discharge characteristic of the battery according to the present invention can be improved. Furthermore, moldability of Li-Ga-In alloy powder can be improved by adding lithium powder, whereby destruction of the negative electrode when molding or installing thereof to the battery can be effectively prevented.

TABLE 1

|  | COMPOSITION OF Li—Ga—In ALLOY (atomic ratio) | WEIGHT OF POWDER Li—Ga—In ALLOY (mg) | DISCHARGE CAPACITY (mAh) |
| --- | --- | --- | --- |
| Ex. 4 | 50:30:20 | 141 | 1.8 |
| Ex. 5 | 50:40:10 | 128 | 1.9 |
| Ex. 6 | 50:20:30 | 155 | 1.4 |
| Ex. 7 | 35:60:5 | 213 | 1.6 |
| Ex. 8 | 35:20:45 | 290 | 1.3 |
| Ex. 9 | 65:12:23 | 90 | 1.5 |
| Ex. 10 | 65:30:5 | 72 | 1.7 |
| Ex. 11 | 25:60:15 | 362 | 1.3 |
| Ex. 12 | 25:15:60 | 483 | 0.9 |
| Ex. 13 | 50:10:40 | 168 | 1.3 |
| Ex. 14 | 75:5:20 | 63 | 1.0 |
| Ex. 15 | 75:20:5 | 49 | 1.1 |
| Ex. 16 | 25:35:40 | 428 | 1.2 |
| Ex. 17 | 35:35:30 | 261 | 1.6 |
| Ex. 18 | 25:70:5 | 336 | 1.2 |

TABLE 2

|  | THEORETICAL VOLUME RATIO OF Li—Ga—In ALLOY POWDER AND Li POWDER | DISCHARGE CAPACITY (mAh) |
| --- | --- | --- |
| Ex. 19 | 1:0.28 | 1.3 |
| Ex. 20 | 1:0.57 | 0.9 |
| Ex. 21 | 1:0.05 | 0.7 |

TABLE 4

|  | DISCHARGE CAPACITY (mAh) |
| --- | --- |
| Ex. 37 | 1.5 |
| Ex. 38 | 17 |

TABLE 3

| | COMPOSITION OF Li—Ga—In ALLOY (atomic ratio) | WEIGHT OF ALLOY POWDER OF Li—Ga—In (mg) | WEIGHT OF Li POWDER (mg) | DISCHARGE CAPACITY (mAh) |
|---|---|---|---|---|
| Ex. 22 | 50:30:20 | 138 | 5.9 | 1.4 |
| Ex. 23 | 50:40:10 | 128 | 5.7 | 1.3 |
| Ex. 24 | 50:20:30 | 151 | 5.9 | 1.1 |
| Ex. 25 | 35:60:5 | 187 | 7.0 | 1.2 |
| Ex. 26 | 35:20:45 | 241 | 7.4 | 0.9 |
| Ex. 27 | 65:12:23 | 97 | 5.0 | 1.2 |
| Ex. 28 | 65:30:5 | 78 | 4.8 | 1.4 |
| Ex. 29 | 25:60:15 | 269 | 8.4 | 1.1 |
| Ex. 30 | 25:15:60 | 334 | 8.9 | 0.7 |
| Ex. 31 | 50:10:40 | 163 | 6.0 | 0.9 |
| Ex. 32 | 75:5:20 | 70 | 4.5 | 0.9 |
| Ex. 33 | 75:20:5 | 56 | 4.3 | 0.9 |
| Ex. 34 | 25:35:40 | 306 | 8.7 | 1.1 |
| Ex. 35 | 35:35:30 | 222 | 7.3 | 1.3 |
| Ex. 36 | 25:70:5 | 253 | 8.3 | 1.0 |

What is claimed is:

1. A lithium secondary battery having a lithium ion electrical conductive electrolyte, a positive electrode, positive electrode activating material and a negative electrode comprising solid Li-Ga-In alloy wherein the composition of Li-Ga-In alloy for the negative electrode is defined by the area surrounded by E(Li 65%, Ga 30% and In 5%), F(Li 35%, Ga 60% and In 5%), G(Li 35%, Ga 35% and In 30%) and H(Li 65%, Ga 12% and In 23%) on the triangular coordinate as shown in FIG. 2.

2. The lithium secondary battery according to claim 1 wherein the negative electrode is formed by mixture of Li-Ga-In alloy powder and lithium powder and shaped by pressing the mixture.

3. The lithium secondary battery according to claim 1 wherein the negative electrode is made of a porous metal in which Li-Ga-In alloy powder is filled in pores of the porous metal.

4. The lithium secondary battery according to claim 1, wherein the negative electrode is made of a porous member in which mixture of Li-Ga-In alloy powder and lithium powder are filled in the pores of porous metal.

5. The lithium secondary battery according to claim 3, wherein said porous metal is nickel.

6. The lithium secondary battery according to claim 1, wherein said positive electrode activate material is made of calcogen compound of transition metal.

7. The lithium secondary battery according to claim 6, wherein said positive electrode active material is made of titanium sulfide.

8. The lithium secondary battery according to claim 4, wherein said porous metal is nickel.

9. The lithium secondary battery according to claim 4, wherein said positive electrode activate material is made of calcogen compound of transition metal.

10. The lithium secondary battery according to claim 5, wherein said positive electrode activate material is made of calcogen compound of transition metal.

* * * * *